No. 857,398. PATENTED JUNE 18, 1907.
D. B. HANLON.
NUL LOCK.
APPLICATION FILED NOV. 20, 1906.

WITNESSES
F. D. Sweet
C. R. Ferguson

INVENTOR
Daniel B. Hanlon
BY Munn & Co
ATTORNEYS

UNITED STATES PATENT OFFICE.

DANIEL B. HANLON, OF NEW LIBERTY, KENTUCKY, ASSIGNOR OF ONE-HALF TO WILSON S. BALL AND THOS. H. NORTH, OF NEW LIBERTY, KENTUCKY.

NUT-LOCK.

No. 857,398.          Specification of Letters Patent.          Patented June 18, 1907.

Application filed November 20, 1906. Serial No. 344,237.

*To all whom it may concern:*

Be it known that I, DANIEL B. HANLON, a citizen of the United States, and a resident of New Liberty, in the county of Owen and State of Kentucky, have invented a new and Improved Nut-Lock, of which the following is a full, clear, and exact description.

This invention relates particularly to improvements in locking devices for nuts on vehicle axle skeins, an object being to provide a nut lock that may be readily and quickly adjusted for locking the nut in position and as readily detached when it is desired to remove a wheel from an axle.

I will describe a nut lock embodying my invention, and then point out the novel features in the appended claims.

Reference is to be had to the accompanying drawings forming a part of this specification, in which similar characters of reference indicate corresponding parts in all the figures.

Figure 1:
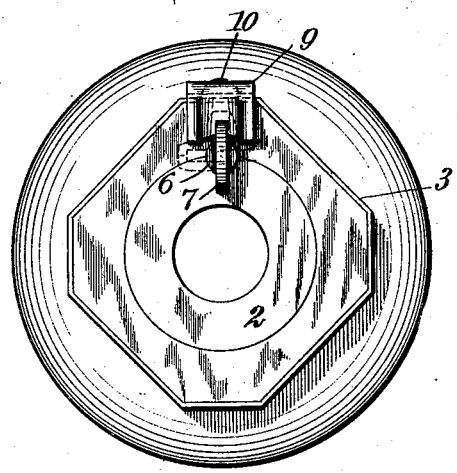
Figure 2:
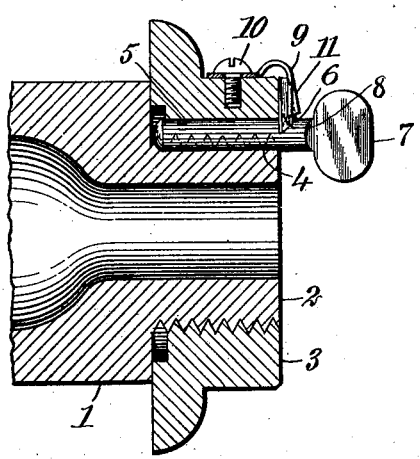
Figure 3:
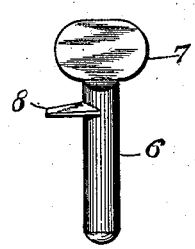

Figure 1 is a front view of a thimble skein and a nut, with a nut lock embodying my invention in connection therewith; Fig. 2 is a sectional view thereof; and Fig. 3 is a perspective view of the locking pin.

Referring to the drawings, 1 designates an axle skein having the usual reduced portion 2 provided with a screw thread for receiving the nut 3. The said reduced portion 2 is provided with a channel 4 and the nut is provided with a channel 5. When these channels 4 and 5 are in alinement, a longitudinal perforation is provided for receiving a locking pin 6 provided at its outer end with a finger piece 7. Adjacent to the finger piece 7 the locking pin is provided with a tongue 8 designed to engage in a spring clip 9 attached to the nut, as here shown, by means of a screw 10.

The spring clip is curved downward over the outer face of the nut 3 and is chambered at its central portion, as indicated at 11, to receive the part 8 carried by the locking pin.

In the operation, after placing the nut on the skein the key is to be inserted and turned to engage the tongue 8 in the chamber 11 in the clip 9, and as said pin engages in the two channels 4 and 5, it is obvious that the nut will be held from turning. To release the nut it is only necessary to give a ¼ turn to the pin, releasing the tongue from the clip and withdrawing the pin.

Having thus described my invention, I claim as new and desire to secure by Letters Patent:

In a nut lock, the combination with an axle having a screw threaded portion provided with a longitudinal groove, of a nut provided with a longitudinal groove adapted to register with the groove of the axle, and co-acting therewith to form a recess, a pin extending into the recess, and provided with a lateral tongue for engaging the face of the nut, and a spring clip secured to the nut and extending over the outer face thereof and provided with a chambered portion for receiving the tongue whereby to lock the pin in place.

In testimony whereof I have signed my name to this specification in the presence of two subscribing witnesses.

DANIEL B. HANLON.

Witnesses:
     A. M. GENTRY,
     H. D. BARKER.